United States Patent [19]

Elrod

[11] Patent Number: 5,031,137

[45] Date of Patent: Jul. 9, 1991

[54] TWO INPUT BIT-SERIAL MULTIPLIER

[75] Inventor: Steven E. Elrod, Auburn, Wash.

[73] Assignee: The Boeing Company, Seattle, Wash.

[21] Appl. No.: 447,434

[22] Filed: Dec. 7, 1989

[51] Int. Cl.$^5$ .............................................. G06F 7/52
[52] U.S. Cl. ..................................... 364/757; 364/758
[58] Field of Search ................................ 364/757–760, 364/754

[56] References Cited

U.S. PATENT DOCUMENTS

| | | | |
|---|---|---|---|
| 3,016,195 | 12/1954 | Hamburgen | 364/758 |
| 3,947,670 | 3/1976 | Irwin et al. | 364/758 |
| 4,135,249 | 1/1979 | Irwin | 364/758 |
| 4,796,219 | 1/1989 | Williams | 364/758 |
| 4,839,847 | 6/1989 | Laprade | 364/757 X |

OTHER PUBLICATIONS

An O(n) Parallel Multiplier with Bit-Sequential Input and Output, Chen et al., IEE Transactions on Computers, vol. C-28, No. 10, Oct. 1979, pp. 721–727.

*Primary Examiner*—Dale M. Shaw
*Assistant Examiner*—Tan V. Mai
*Attorney, Agent, or Firm*—Foley & Lardner

[57] ABSTRACT

A reduced adder precision apparatus uses two adders to produce a serial output product of two serial input digital numbers. The multiplier operates on a bit by bit basis, beginning with the least significant bit, to determine each bit of the product without any information concerning the more significant bits. Each bit of each input is read sequentially and the bit sequences are stored in registers. A value based on the sequence built from the second digital number is added to an accumulation of a residue from a shift register used to determine the output bit of the examined bit of the first digital number is a logical one. Similarly, a value based on the sequence built from the first digital number is added to an accumulation of a residue from the shift register if the bit examined from the second digital number is a logical one.

18 Claims, 4 Drawing Sheets

TWO INPUT BIT-SERIAL MULTIPLIER

BACKGROUND OF THE INVENTION

I. Field of the Invention

The present invention relates to the field of digital computation and more particularly to multiplication of binary numbers.

II. Related Art

In a 1979 paper, *An O(n) Parallel Multiplier with Bit-Sequential Input and Output*, Chen and Willoner described a parallel multiplier which operates in time O(n) where n is the maximum of the lengths of the multiplier and the multiplicand, both expressed in binary fixed point notation. The paper disclosed a logic circuit of 2n modules with each module having five inputs and three outputs, each being slightly more complex than a full adder. Chen and Willoner disclose a method in which the input is required bit-sequentially, and the output is generated bit-sequentially but in which the circuitry results in the outputs being kept in place. This is necessary to provide the parallel output and requires bit by bit multiplexing to obtain a serial representation of the product.

U.S. Pat. No. 4,135,249 to Irwin for A Signed Double Precision Multiplication Logic describes a multiplier with a plurality of identical multiplication cells forming partial products summed in largely identical summation cells to form the final product. Each multiplication cell stores a multiplier bit and contains a stage of a multiplicand shift register and a stage of a timing waveform shift register. Both the signed multiplication logic of Irwin and the disclosure by Chen and Willoner differ from the invention described herein relative to the required adder precision. In Chen and Willoner, a 32 bit multiplier requires two 32 bit adders. The disclosure in U.S. Pat. No. 4,135,249 to Irwin and in related U.S. Pat. No. 3,947,670, also to Irwin, would require two 32 bit adders in the case of a 32 bit multiplier. The invention described herein provides for dividing the result by two during every iteration so that only about half the adder precision, i.e., $N/2+1$, is required. Thus, only two 17 bit adders would be necessary.

U.S. Pat. No. 3,016,195 to Hamburgen also discloses a binary multiplier. Unlike the multipliers of Irwin, Hamburgen uses n cells where n is the number of bits in the multiplicand and the multiplier rather than 2n cells as disclosed both by Chen and Irwin. However, Hamburgen discloses a method significantly different from that described herein.

SUMMARY OF THE INVENTION

In view of the foregoing limitations it is an object of the invention to provide an improved serial multiplication method and apparatus.

It is a further object of the invention to provide a method and apparatus for obtaining, one bit at a time, a serial output product of two serial inputs.

It is a still further object of the invention to provide a simplified apparatus for obtaining the product of two binary numbers.

It is a still further object of the invention to provide an apparatus which reduces the required adder precision.

These and other objects of the invention are achieved by a method in which the result is divided by two during every iteration so that half the adder precision is required. Thus, the method initializes an accumulator sum and first and second variables to zero. On a bit by bit basis, the nth bit of a first digital word applied to a first input is examined and, if it is a logical one, the value of the second variable is added to the accumulator sum. The nth bit of the digital word applied to the second input is examined and the value of the first variable is added to the accumulator sum if the bit examined at the second input is a logical one. An output bit, Output (n), corresponding to the position of the input bits is then determined based on the value of the accumulator sum mod 2 and the accumulator sum is then divided by two. The process is repeated for each of the bits. A second embodiment of the invention applies a bit mask to assume that the value of each input bit is a logical one resulting in an output word equal to one. Each time a zero is encountered in one of the input digital words, the assumption is corrected by subtracting the total number of zeroes encountered from an assumed value. Another correction factor is then applied to compensate for double counting zeroes when the bits read from the two input words are logical zeroes.

DETAILED DESCRIPTION OF THE PREFERRED EMBODIMENTS

A model for a two input bit-serial multiplier contains two 1-bit inputs and one 1-bit output. Beginning with the least significant bit (LSB) the inputs are shifted in, one bit at a time. The output is shifted out one bit at a time and is produced during the same clock cycle that the two input bits are present. Thus, all output bits are calculated from inputs of the same or lower significance and no information about input bits of greater significance is needed.

Figure 1:
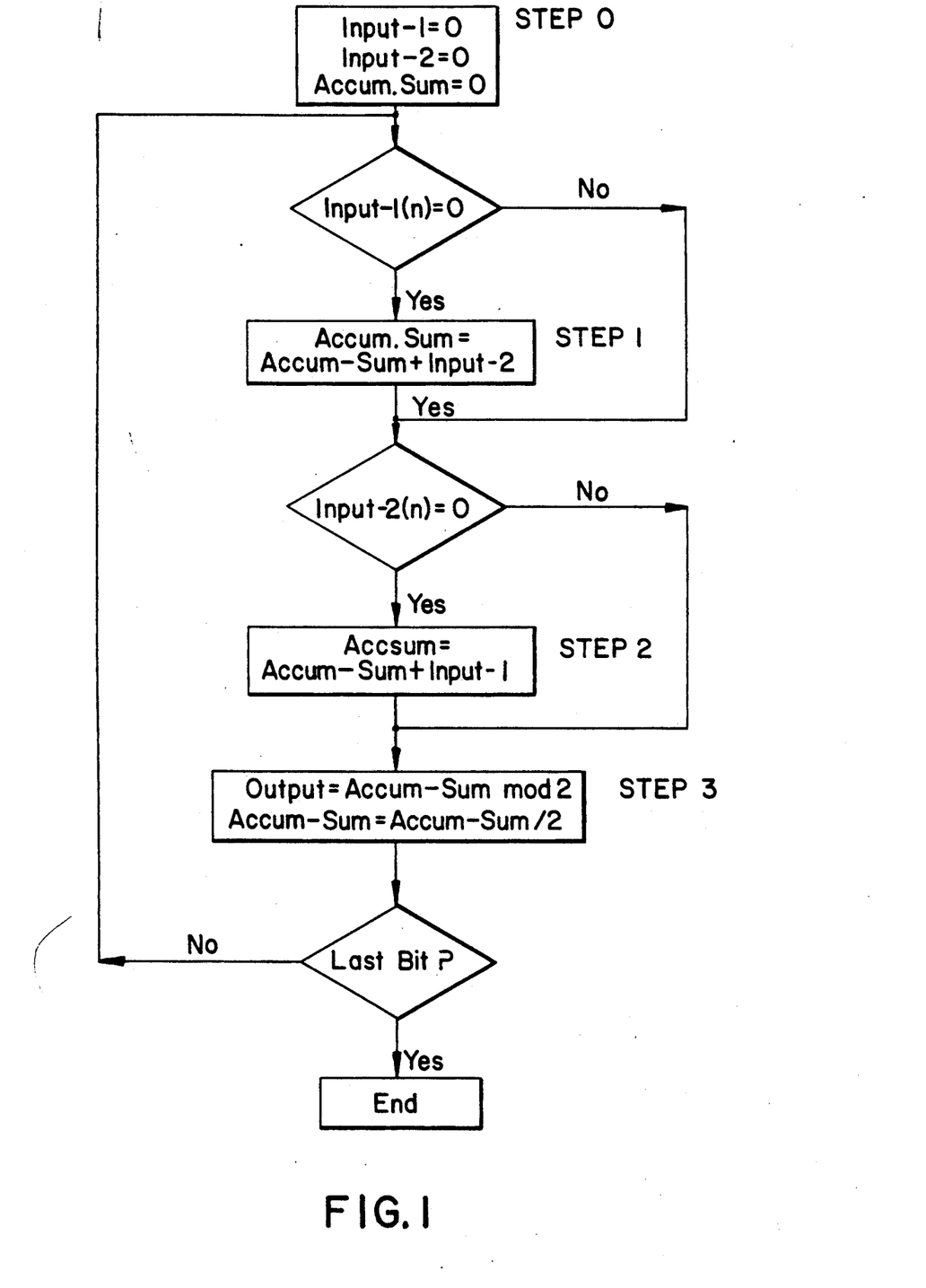
FIG. 1 is a flow diagram showing the method according to a first embodiment.

FIG. 1 is a diagram of a method according to a first embodiment. In this embodiment, during initialization of the multiplication process, three variables, in1, in2, and Accum_sum, are set equal to zero. Since this is an initialization step, it is not repeated when carrying out subsequent steps of the method on the same multiplier and multiplicand. The input digital words are then applied bit by bit to the first and second inputs and the bits tested. If the nth bit of in1 equals logical 1, then the accumulator sum, Accum_sum, is adjusted by adding the value of in2 based on the in2 bits which have been read previously. The next step in the method is to input the nth bit of in2, which is in2(n). If in2(n) is a logical one, then Accum_sum is adjusted to equal Accum_sum plus the value represented by all the previously examined bits of in1. To determine the output under this method one evaluates Accum_sum mod 2. Accum_sum is then set equal to the previous value of Accum_sum divided by two. This can be accomplished by a right shift of one bit. The output bit is the value of the bit shifted right out of the Accum_sum register and the value of Accum_sum is determined by the remaining bits. The process is then repeated until each of the bits has been evaluated.

Examples 1 and 2 shown below illustrate the values taken on at each of the steps during each cycle of a clock as the bits are serially read and evaluated. Clock cycles are numbered to correspond to the bit position of the bits of the first and second words. Thus, during clock cycle 0, the first or least significant bits (bits in the zero position) of the first and second digital words are read and the least significant bit of the product of the numbers represented by the first and second digital words is generated. The examples use hexadecimal notation of digital numbers in a 2s complement bit representation having 16 bits per word (4 bits for each hexadecimal digit). Both representations are shown. The Examples further indicate which steps of the method illustrated in FIG. 1 are carried out based on the status of the bits read.

In the first example, two positive numbers are multiplied. After initialization, the first bit of the first digital word is read during cycle 0. Since it is a logical one, STEP 1 of the method illustrated in FIG. 1 is executed. As a result, the value of Accum_sum is adjusted by adding to it the current value of in2. Here, in2 is zero, as a result of the initialization step. Thus, Accum_sum remains zero. Next the first bit of in2 is read. Since this bit is a logical zero, there is no effect on the value of Accum_sum and STEP 2 of the method in FIG. 1 is skipped. In practice, as described below, this can be accomplished simply by adding zero to the value of Accum_sum, so that addition steps parallel to those carried out when a logical one is detected at the input can be carried out. This reduces hardware requirements and simplifies implementation as discussed relative to FIG. 4. According to STEP 3 of the method, a one bit right shift of Accum_sum produces the first or least significant output bit (in this case zero) which is Accum_sum mod 2. This leaves in the register Accum sum divided by two, as also required by the method. During cycle 1, the second bits of the multiplier and multiplicand digital words are read. As shown by Example 1, since in1 is a logical one and in2 is a logical zero, the same sequence of steps is carried out as that of cycle 0.

In cycle 2, the third least significant bits of the digital input words are read. In example 1, the third input bit of the first digital word is a logical zero. Therefore, no action is taken to affect the value of Accum_sum and STEP 1 of FIG. 1 is not executed. In practice, as previously mentioned, a zero can be added to the value of Accum sum. Since the third bit read from the second digital word is a logical one, STEP 2 is executed. Thus, Accum_sum is adjusted by adding the value of the word represented by all previously read bits of the first input, in1. Since the current value of Accum_sum is zero and all the bits of the first input taken together are 011 (or 3 hex), Accum_sum becomes 011. Executing STEP 3 of the method according to the shifting method discussed above, the third output bit of the product is a logical one and the Accum_sum value in the register equals one.

During cycle 3, both inputs read are logical zero and the register containing Accum_sum is not adjusted, since both STEP 1 and STEP 2 are not executed. As previously discussed, this can be accomplished by adding zero to the value of Accum sum at each step. However, when STEP 3 is executed, as it always is, the logical one in the register containing Accum_sum is shifted out of the register as the forth bit of the product. Zero remains in the register containing Accum_sum. Since Accum_sum is zero and all the remaining bits are zero, no further changes occur in the output bits and the output is 1100, which equals c hex or 12 decimal.

Example 2 illustrates that the method operates equally well for determining a product of negative digital numbers. As previously mentioned, in the example the digital representation of the numbers is 2s complement notation.

Figure 3:
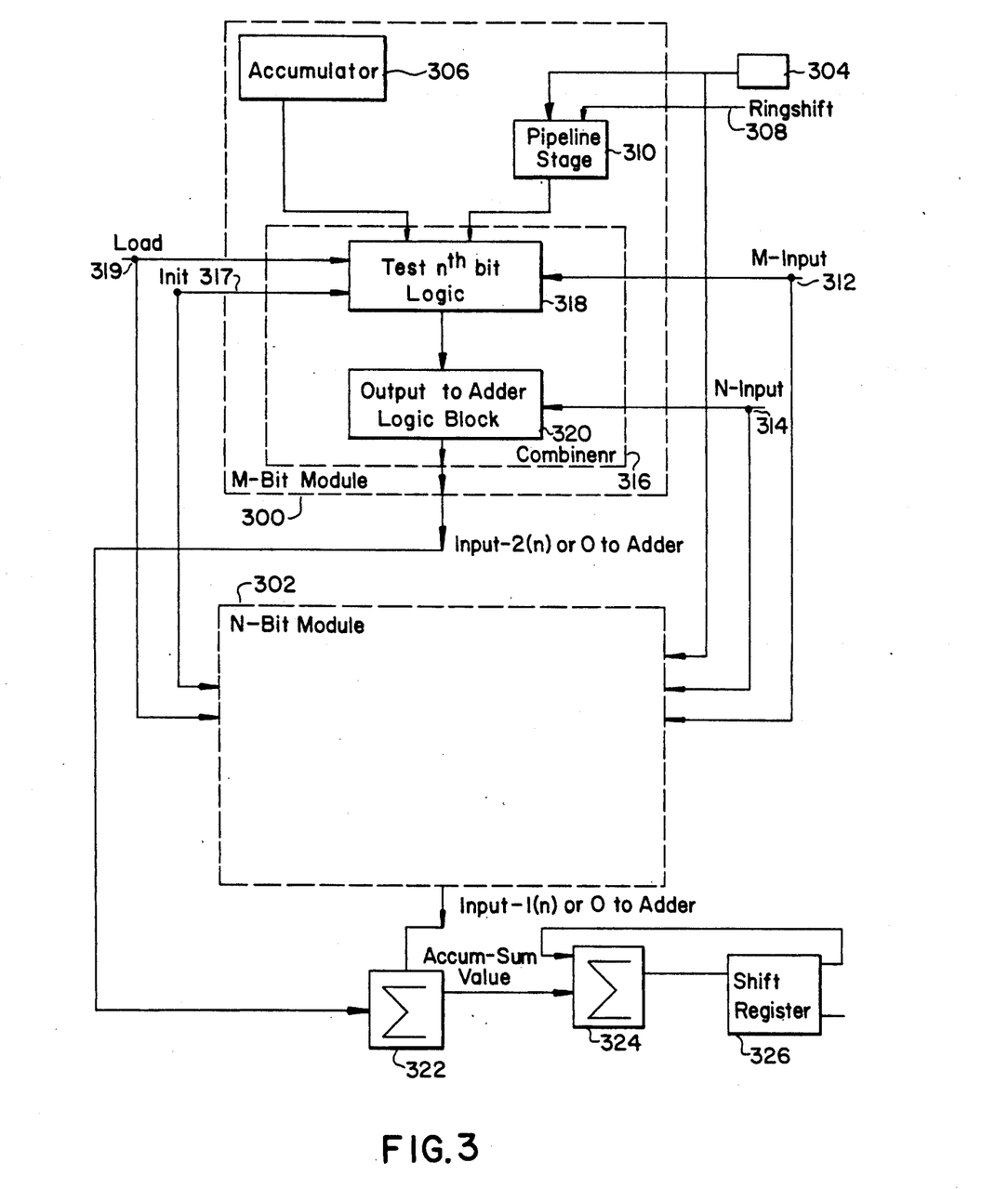
FIG. 3 is a block diagram showing a structure of the invention according to the first embodiment.

FIG. 3 is a block diagram showing an implementation of the method according to the first embodiment. As shown in FIG. 3, the apparatus has two substantially identical modules 300 and 302. The modules are constructed to operate on the bits sequentially. Ring count buffer 304 using a shifting from the least significant bit identifies which bit, either an M bit from Input-1, (the M input), or an N bit from Input-2, (the N input) is active in the present time. Thus, one module, e.g., 300 operates based on the values of the M bits while the second module 302 operates based on the values of the N bits. Accumulator 306 in module 300, the M accumulator, accumulates bits from Input-1, while module 302 contains a corresponding N accumulator to accumulate bits from Input-2. Similarly the M and N inputs in second module 302 would be reversed from those of module 300. In each module 300, 302, ring shift 308 connected to pipeline stage 310 forces a logical 1 onto a bus in the first cycle. M input 312, the output from M accumulator 306, the output from pipeline stage 310 and N input 314 are combined in module 316.

<u>Example 1:</u>  3*4;  (0000 0011)*(0000 0100)

```
cycle 0
    in1            = 1      0000000000000001
    STEP 1
    Accum_sum      = 0      0000000000000000
    in2            = 0      0000000000000000
    STEP 3
    Accum_sum      = 0      0000000000000000   OUTPUT=0
cycle 1
    in1            = 3      0000000000000011
    STEP 1
    Accum_sum      = 0      0000000000000000
    in2            = 0      0000000000000000
    Accum_sum      = 0      0000000000000000   OUTPUT=0
    STEP 3
    Accum_sum      = 0      0000000000000000
```

```
cycle 2
    in1              = 3      0000000000000011
    in2              = 4      0000000000000100
    STEP 2
    Accum_sum        = 3      0000000000000011
    Accum_sum        = 3      0000000000000011    OUTPUT=1
    STEP 3           = 3
    Accum_sum        = 1      0000000000000001
cycle 3
    in1              = 3      0000000000000011
    in2              = 4      0000000000000100
    Accum_sum        = 1      0000000000000001    OUTPUT=1
    STEP 3
    Accum_sum        = 0      0000000000000000
cycle 4
    in1              = 3      0000000000000011
    in2              = 4      0000000000000100
    Accum_sum        = 0      0000000000000000    OUTPUT=0
    STEP 3
    Accum_sum        = 0      0000000000000000
cycle 5
    in1              = 3      0000000000000011
    in2              = 4      0000000000000100
    Accum_sum        = 0      0000000000000000    OUTPUT=0
    STEP 3
    Accum_sum        = 0      0000000000000000
cycle 6
    in1              = 3      0000000000000011
    in2              = 4      0000000000000100
    Accum_sum        = 0      0000000000000000    OUTPUT=0
    STEP 3
    Accum_sum        = 0      0000000000000000
cycle 7
    in1              = 3      0000000000000011
    in2              = 4      0000000000000100
    Accum_sum        = 0      0000000000000000    OUTPUT=0
    STEP 3
    Accum_sum        = 0      0000000000000000
cycle 8
    in1              = 3      0000000000000011
    in2              = 4      0000000000000100
    Accum_sum        = 0      0000000000000000    OUTPUT=0
    STEP 3
    Accum_sum        = 0      0000000000000000
cycle 9
    in1              = 3      0000000000000011
    in2              = 4      0000000000000100
    Accum_sum        = 0      0000000000000000    OUTPUT=0
    STEP 3
    Accum_sum        = 0      0000000000000000
cycle 10
    in1              = 3      0000000000000011
    in2              = 4      0000000000000100
    Accum_sum        = 0      0000000000000000    OUTPUT=0
    STEP 3
    Accum_sum        = 0      0000000000000000
cycle 11
```

```
       in1             = 3       0000000000000011
       in2             = 4       0000000000000100
       Accum_sum       = 0       0000000000000000    OUTPUT=0
       STEP 3
       Accum_sum       = 0       0000000000000000
cycle 12
       in1             = 3       0000000000000011
       in2             = 4       0000000000000100
       Accum_sum       = 0       0000000000000000    OUTPUT=0
       STEP 3
       Accum_sum       = 0       0000000000000000
cycle 13
       in1             = 3       0000000000000011
       in2             = 4       0000000000000100
       Accum_sum       = 0       0000000000000000    OUTPUT=0
       STEP 3
       Accum_sum       = 0       0000000000000000
cycle 14
       in1             = 3       0000000000000011
       in2             = 4       0000000000000100
       Accum_sum       = 0       0000000000000000    OUTPUT=0
       STEP 3
       Accum_sum       = 0       0000000000000000 cycle 15
       in1             = 3       0000000000000011
       in2             = 4       0000000000000100
       Accum_sum       = 0       0000000000000000    OUTPUT=0
       STEP 3
       Accum_sum       = 0       0000000000000000
3*4   = c hex = 12

Example 2:   2*(-63,;  (0010)*(1111 1111 1111 1111 1100 0001
cycle 0
       in1             = 0       0000000000000000
       in2             = 1       0000000000000001
       STEP 2
       Accum_sum       = 0       0000000000000000
       Accum_sum       = 0       0000000000000000    OUTPUT=0
       STEP 3
       Accum_sum       = 0       0000000000000000
cycle 1
       in1             = 2       0000000000000010
       STEP 1
       Accum_sum       = 1       0000000000000001
       in2             = 1       0000000000000001
       Accum_sum       = 1       0000000000000001    OUTPUT=1
       STEP 3
       Accum_sum       = 0       0000000000000000
cycle 2
       in1             = 2       0000000000000010
       in2             = 1       0000000000000001
       Accum_sum       = 0       0000000000000000    OUTPUT=0
       STEP 3
       Accum_sum       = 0       0000000000000000
cycle 3
       in1             = 2       0000000000000010
```

```
    in2             = 1      0000000000000001
    Accum_sum       = 0      0000000000000000    OUTPUT=0
    STEP 3
    Accum_sum       = 0      0000000000000000
cycle 4
    in1             = 2      0000000000000010
    in2             = 1      0000000000000001
    Accum_sum       = 0      0000000000000000    OUTPUT=0
    STEP 3
    Accum_sum       = 0      0000000000000000
cycle 5
    in1             = 2      0000000000000010
    in2             = 1      0000000000000001
    Accum_sum       = 0      0000000000000000    OUTPUT=0
    STEP 3
    Accum_sum       = 0      0000000000000000
cycle 6
    in1             = 2      0000000000000010
    in2             = 41     0000000000000001
    STEP 2
    Accum_sum       = 2      0000000000000010
    Accum_sum       = 2      0000000000000010    OUTPUT=0
    STEP 3
    Accum_sum       = 1      0000000000000001
cycle 7
    in1             = 2      0000000000000010
    in2             = c1     0000000011000001
    STEP 2
    Accum_sum       = 3      0000000000000011
    Accum_sum       = 3      0000000000000011    OUTPUT=1
    STEP 3
    Accum_sum       = 1      0000000000000001
cycle 8
    in1             = 2      0000000000000010
    in2             = 1c1    0000000111000001
    STEP 2
    Accum_sum       = 3      0000000000000011
    Accum_sum       = 3      0000000000000011    OUTPUT=1
    STEP 3
    Accum_sum       = 1      0000000000000001
cycle 9
    in1             = 2      0000000000000010
    in2             = 3c1    0000001111000001
    STEP 2
    Accum_sum       = 3      0000000000000011
    Accum_sum       = 3      0000000000000011    OUTPUT=1
    STEP 3
    Accum_sum       = 1      0000000000000001
cycle 10
    in1             = 2      0000000000000010
    in2             = 7c1    0000011111000001
    STEP 2
    Accum_sum       = 3      0000000000000011
    Accum_sum       = 3      0000000000000011    OUTPUT=1
    STEP 3
    Accum_sum       = 1      0000000000000001
cycle 11
```

```
        in1               = 2      0000000000000010
        in2               = fc1    0000111111000001
        STEP 2
        Accum_sum         = 3      0000000000000011
        Accum_sum         = 3      0000000000000011    OUTPUT=1
        STEP 3
        Accum_sum         = 1      0000000000000001
cycle 12
        in1               = 2      0000000000000010
        in2               = 1fc1   0001111111000001
        STEP 2
        Accum_sum         = 3      0000000000000011
        Accum_sum         = 3      0000000000000011    OUTPUT=1
        STEP 3
        Accum_sum         = 1      0000000000000001
cycle 13
        in1               = 2      0000000000000010
        in2               = 3fc1   0011111111000001
        STEP 2
        Accum_sum         = 3      0000000000000011
        Accum_sum         = 3      0000000000000011    OUTPUT=1
        STEP 3
        Accum_sum         = 1      0000000000000001
cycle 14
        in1               = 2      0000000000000010
        in2               = 7fc    0111111111000001
        STEP 2
        Accum_sum         = 3      0000000000000011
        Accum_sum         = 3      0000000000000011    OUTPUT=1
        STEP 3
        Accum_sum         = 1      0000000000000001
cycle 15
        in1               = 2      0000000000000010
        in2               = ffc1   1111111111000001
        STEP 2
        Accum_sum         = 3      0000000000000011
        Accum_sum         = 3      0000000000000011    OUTPUT=1
        STEP 3
        Accum_sum         = 1      0000000000000001
```

2\*(-63)=2\*(ffffffc1)hex = -126=ffffff82 hex in module 316. M accumulator 306 functions to hold the value as M bits from Input-1 are shifted in. Initialization signals 317 and load signals 319 also function to operate the logic.

In accordance with the method as previously described, after initialization, the nth bit of Input-1 (the M input), is checked to determine if the bit value is a one, as evaluated in logic block 318. This information determines the output from logic block 320 in accordance with the method previously described. Thus, if Input-1(n) is a M accumulator 306 functions to hold the value as M bits from Input-1 are shifted in. Initialization signals 317 and load signals 319 also function to operate the logic.

In accordance with the method as previously described, after initialization, the nth bit of Input-1 (the M input), is checked to determine if the bit value is a one, as evaluated in logic block 318. This information determines the output from logic block 320 in accordance with the method previously described. Thus, if Input-1(n) is a logical 1, logic block 320 is directed to output the value of Input-2. Since the above method requires that the accumulator sum be adjusted by adding the value of Input-2 to the previous value of the accumulator sum, the output of logic element 320 is routed to adder 322 having a precision of $N/2+1$ bits, where N is the maximum number of bits in the output product. Similarly, since the accumulator sum is not adjusted if Input-1 is a logical zero, logic element 320 outputs a zero to adder 322 when Input-1 is a zero. The output of adder 322 is then routed to adder 324 which adjusts the value of the accumulator sum, Accum_sum. Thus, the steps of the method involving the bits of Input-1 are conveniently implemented.

Circuitry similar to that described in logic block 300 is found in logic block 302 which evaluates the nth bit of Input-2 according to the method described above. Using this same approach, logic block 302 outputs either a zero or a value of Input-1 based on the previously examined bits of Input-1, depending on whether Input-2 is zero or one, respectively.

It should be noted that the circuitry is pipelined in such a way that when one logic element 300 or 302 operates on the nth bit, the other logic element operates on the preceding bit to enhance processing speed. Shift register 326 then shifts the value of the accumulator sum, Accum_sum, to output the corresponding nth bit of the product. The remaining bits form the Accum_sum value to be used at one of the inputs to adder 324 when the next bit is read. As a result of this shifting in shift register 326, adder 324 requires a precision of $N/2+1$ to produce an N bit output.

Figure 4:
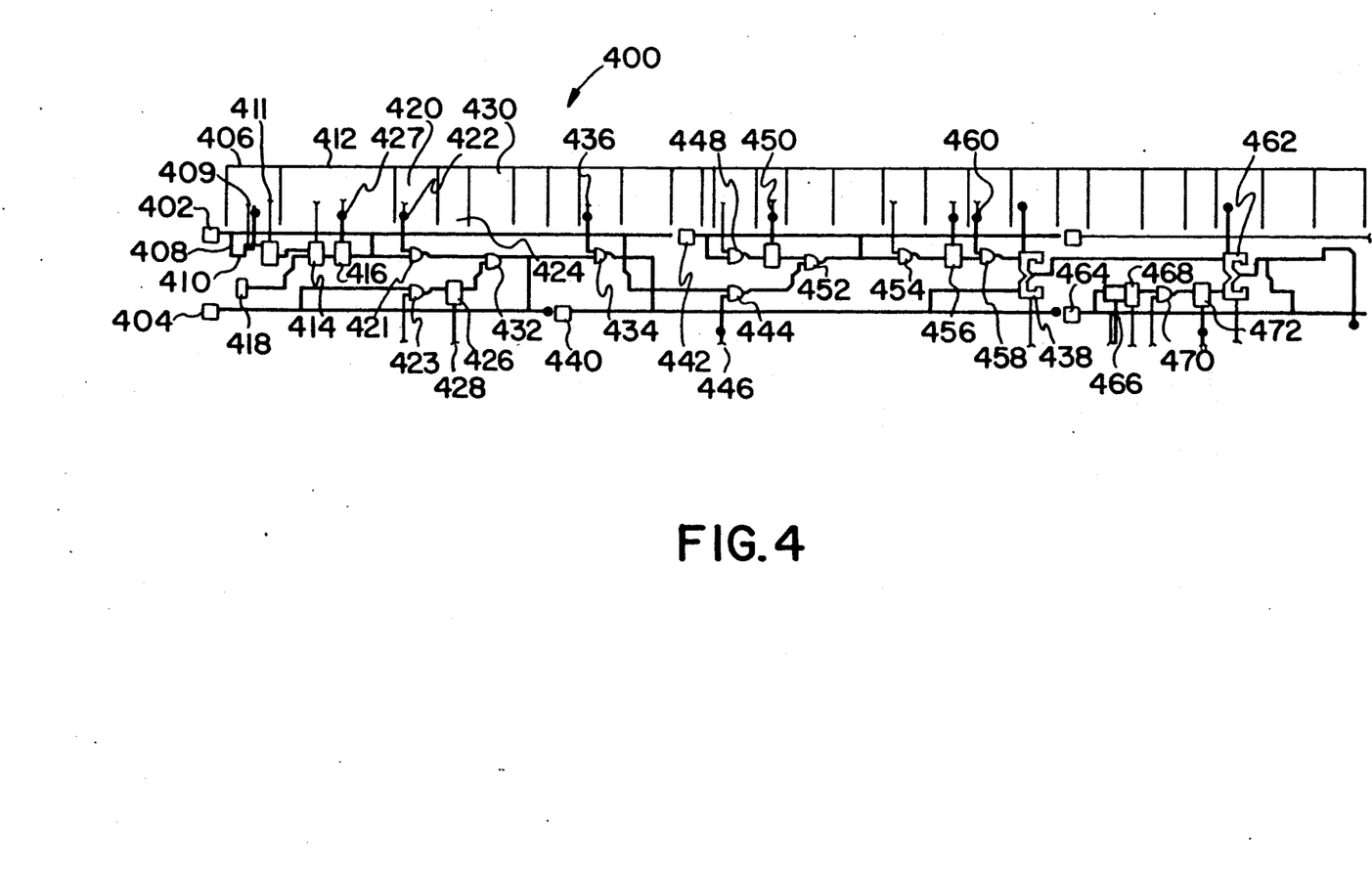
FIG. 4 shows an implementation of the first embodiment.

FIG. 4 shows a complete circuit implementation 400 of the parallel data path design of the first embodiment. Ringcount buffer 402 identifies which bit is active at any time. M-ACCUM 404 holds the value as M is shifted in. Ringshift block 406 has a left shift function 408 having input 409 and multiplexor 410 with enable input 411. RNGMUX 412 is a pipeline stage containing multiplexor 414 and latch 416. RNGSHIFT-ST2 418 is connected to multiplexor 414 in order to force a logical 1 onto the bus in the first cycle. The output from pipeline stage 412 is routed to MASINIT stage 420. M-input 422 is connected to a NAND gate on one bus while the output from M-ACCUM is connected to a NAND gate on a second bus.

In the MAS-FF stage 424, latch 426 is connected to the output of NAND gate 423. The logic is frozen until load lines 427, 428 are active. In the next stage, MAS-OR 430, the output of NAND gate 421 in MASINIT stage 420 and the output of latch 426 in MAS-FF stage 424 are inputs to NAND gate 432. The output of NAND gate 432 is routed to AND gate 434 whose second input 436 is connected to the N-input. As previously discussed, the result of this logic configuration is that in step 1 of the method either Input-2 or a logical zero is routed to adder 438. To accomodate N output bits, adder 438 need have bit presicion of $N/2+1$ bits.

The output of NAND gate 434 is further connected to register M-ADD 440.

A second arrangement of logic performs essentially the same function relative to the other bit inputs to the multiplier. Register 442, N-ACCUM, holds the value as N is shifted in. NAND gate 444 has one input connected to RINGCOUNT register 402 and its other input connected to N-input 446. Thus, the logical function implemented by NAND gates 444, 448 and 452 and latch 450 is essentially the same function implemented by NAND gates 421, 423, 432 and latch 426. The output of NAND gate 452 is routed to latch 456 via NAND gate 454. Latch 456 provides one input to OR gate 458. The other input 460 of OR gate 458 is connected to the M-input. The output of OR gate 458 which is thus either a zero or Input-1, is routed to adder 438. Thus, adder 438 adds the output of NAND gate 434 (Input-2 or 0) to the output of OR gate 458 (Input-1 or 0). Depending on the status of the bits, the output of adder 438 will be either (Input-1)+0 or (Input-2)+0 or (Input-1)+(Input-2). It should be noted that processing takes place sequentially, so that, for example, during the sixth cycle the accumulator has a valid bit 5 and bit 6 is on the bus. Thus, if we are dealing with Input-1 (N), Input-2 is Input-2 (N-1).

Referring again to FIG. 4, the output of adder 438 provides one input to second adder 462. The other input to adder 462 is based on the value in accumulator register 464. The output of adder 462 is fed back so that a shifting operation can be performed in shifter 466. As a result of this shifting operation, adder 462 need have bit precision of only $N/2+1$ to produce an N bit product at the output. The shifter is also connected to multiplexor 468 and AND gate 470 whose output is then latched into flip-flop 472.

According to the method of a second embodiment, it is assumed that all future inputs have a value of logical 1. If the inputs during any clock cycle are both logical 1, no correction of the underlying assumption is made. If one or both of the inputs are logical zero, however, the assumption is corrected. Assuming that all the inputs are logical 1's (ffffffff for a 32 bit word in hexadecimal notation), the output would be 00000001 hex. This is because ffffffff hex equals $-1$, and $-1 * -1$ equals 1. Anytime a 0 is input, the assumption is corrected by subtracting the total number of zeros received from the currently assumed value. This corrects the vertical sum in a sum of products matrix, as shown below. However, the correction is too great in a certain number of cases. Thus, a new correction must be based on presently acquired data about the inputs.

The examples in Table 1 show that, since the assumed values were all ones, the vertical columns of additions should have a 0 in them for every 0 which has already been input. However, a problem

TABLE 1

| 1111 (−1) | 1111 (−1) | 1110 (−2) | 1110 (−2) |
|---|---|---|---|
| 1111 (−1) | 1110 (−2) | 1111 (−1) | 1110 (−2) |
| 1111111 | 0000000 | 1111110 | 0000000 |
| 111111 | 111111 | 111110 | 111110 |
| 11111 | 11111 | 11110 | 11110 |
| 1111 | 1111 | 1110 | 1110 |
| 00000001 (1) | 00000010 (2) | 00000010 (2) | 00000100 (4) | correction factors
. (total number of zeros seen since initialization)

| 00000000 | 11111111 | 11111111 | 22222222 | correction factors
(compensation for doubly counted corrections)

| 00000000 | 00000000 | 00000000 | 00000001 | arises for those output bits which have essentially been reset twice (i.e., 0*0 as shown in −2*−2). In these cases, the compensation factor effectively locates those points created by 0*0 and makes sure that only one is subtracted rather than the two that would be indicated by the 0 counting correction.

Figure 2:
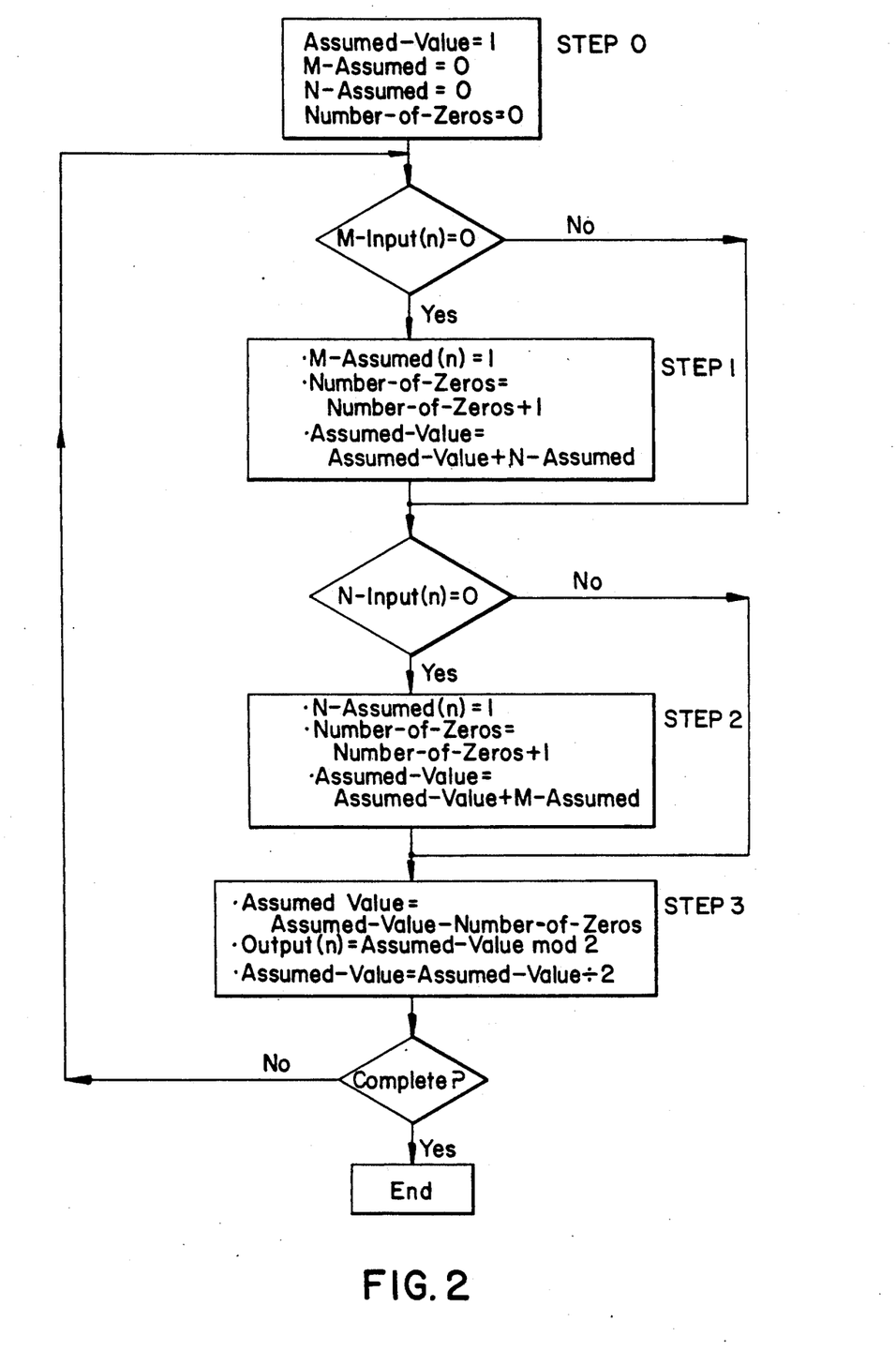
FIG. 2 is a flow diagram showing the method according to a second embodiment.

The procedure for producing the output can be summarized in the following steps, as shown in FIG. 2. During initialization the assumed value is initialized to 00000001 hex and stored in a register. Variables M-assumed and N-assumed are initialized to 0 and the number of zeros is assumed to be 0. Each of these is also stored in a register. Since this is an initialization step, it is performed only once for each multiplication.

Following initialization each of the bits read from the M input and N input are tested. If the M input is a 0 then the corresponding bit of a variable, M_assumed, is set equal to logical 1. The register containing the number of zeros is incremented by one and the assumed value is set equal to the previous assumed value plus the value of the second variable, N_assumed.

Next the value of the N input is tested. As shown in FIG. 2, if the value of an N input is a zero then the corresponding bit of a variable N assumed is taken to be one, the register containing the number of zeros is incremented by one and the assumed value is equal to the assumed value plus the value of M-assumed. The next step is to adjust the assumed value by subtracting the number of zeros, compensated if necessary as discussed above for instances of 0*0 and to determine the output, equal to the assumed value mod 2. The assumed value is then set to be the assumed value divided by two, which can be accomplished by a rightward shift of the register containing the assumed value. As shown in FIG. 2, the process is then repeated until the bits are exhausted.

An example of the method is given below. The example uses two eight-bit inputs and produces an eight-bit output. In practice this would require a ten-bit accumulator (N+2) and would operate as long as the result is 8-bits or smaller. Of course, the method could be extended to any number of bits if the accumulator and corresponding intermediate registers are lengthened accordingly. The example below illustrates each of the steps which takes place at each clock cycle and is given in hexadecimal notation assuming a 2s complement bit representation of the numbers.

As shown in FIG. 2, after initialization, assumed_value is 0001 and M_assumed, N_assumed and number_of_zeroes are zero. In example 3, during clock cycle 0, a processor reads the first or least significant bit on the M input to be a logical zero. Thus, M_assumed is set equal to one, number_of zeroes is incremented to one, and N_assumed (at this time equal to zero) is added to assumed_value to produce a value of one in the register containing assumed_value. Next, the N input bit is read to be a logical 1. Since a logical zero was not read, as shown in FIG. 2, STEP 2 is skipped, processing control transfers to STEP 3 and the values of the variables are not affected. At STEP 3, assumed value is adjusted by subtracting the number of zeroes encountered to this point. Since one zero has been encountered, and since assumed_value is one, the subtraction results in zero remaining in the register containing assumed_value.

The corresponding output bit is obtained by a single bit right shifting operation performed on the register containing assumed_value to obtain assumed value mod 2 as the output bit and to divide the value in the register by two. The steps are then repeated for each bit of the first and second digital words appearing on the M and N inputs. Example 4 operates the same way and is included to illustrate the operation of the method of the second embodiment using negative numbers.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A method of multiplying two binary numbers in a reduced adder precision apparatus comprising the steps of:

(a) initializing first, second, and third storage register means for first, second and third variables, respectively, to zero;

(b) beginning with a least significant bit of a first digital number, sequentially reading into the first storage register means bits of the first digital number, and as each bit of the first digital number is read in, sequentially examining each bit of the first digital number for its logical state, and:

if the bit read is a logical 1, adjusting the third storage register means by routing the second variable in the second storage register means to a first input of a first adder, an output of the first adder being connected to a first input of a second adder, the second adder having a second input connected to the third storage register means to set the third variable equal to a previous value of the third variable plus the second variable in the second storage register means;

if the bit is a logical zero, adding zero to the value in the third storage register means by routing a logical zero to the first input of the first adder;

(c) immediately after reading a bit of the first digital number, beginning with a least significant bit of a second digital number, sequentially reading into the second storage register means a bit of the second digital number corresponding to the bit read into the first storage register means, as each bit of the second number is read in, sequentially examining each bit of the second digital number for its logical state, and:

if the bit is a logical 1, adjusting the third storage register means by routing the first variable in the first storage register means to a second input of the first adder to adjust the variable in the third storage register means;

if the bit is a logical zero, adding zero to the value in the third storage means by routing a logical zero to the second input of the first adder;

d) for each bit read into the first storage register means, shifting the third variable in the third storage register means to arrive at a new quantity and substituting the new quantity for the third variable in the third storage register means;

(e) for each bit read into the first storage register means, setting a corresponding output bit at a serial output of the apparatus equal to a logical value obtained from the third variable mod 2 using an output from the shifting of the third variable;

(f) repeating steps (a) through (e) until all the bits of the first and second digital numbers are exhausted.

2. The method of claim 1 comprising the step of reading each bit of the first and second digital numbers serially and determining the corresponding output bit without any information of the next most significant bit.

3. The method recited in claim 1 further comprising determining the first and second variables as a value equivalent to a binary number represented by a sequence of the present and previously examined bits ordered from the least significant bit corresponding to the first examined bit to the most significant bit corresponding to the presently examined bit.

4. The method of claim 1 wherein the step of setting the output bit comprises setting the output bit equal to the right most bit of the third variable.

5. The method of claim 1 wherein the step of shifting the third variable comprises shifting the third variable right by one bit.

6. The method of claim 1 further comprising the step of examining the bits sequentially, such that when a bit of one digital number is the least significant bit, a corresponding bit of the other digital number is the next least significant bit.

7. The method of claim 1 further comprising producing up to N serial output bits by providing the first and second adders with bit precision of $N/2+1$ bits wherein N is an even number.

8. A method of multiplying first and second digital numbers in a reduced adder precision apparatus comprising the steps of:
(a) reading into a first register an nth bit of a first input and determining a logical value of the bit read;
(b) if the logical value read equals zero, then routing a zero to a first input of a first adder and if the logical value of the bit read equals one, routing to the first input of the first adder a value determined by a sequence of all the bits read from a second input, the bit sequence extending from a least significant bit to the $(n-1)$ bit;
(c) reading into a second register an nth bit of the second input and determining the logical value of the bit read from the second input;
(d) if the logical value of the bit read from the second input equals zero, then routing a zero to a second input of the first adder and if the logical value of the bit read from the second input is a logical 1, routing to the second input of the first adder a value determined by a sequence of all the bits read from the first input, the bit sequence extending from the least significant bit to the nth bit;
(e) routing an output of the first adder to a first input of a second adder the output of the first adder being a sum of the first and second inputs of the first adder;
(f) routing to a second input of the second adder an accumulated value, the accumulated value being a residue of a shifting operation performed on a previous output of the second adder;
(g) routing an output of the second adder to a shift register the output of the second adder being a sum of the first and second inputs of the second adder, in order to perform a next shifting operation, serially shifting the output of the second adder to an output port, each bit representing a bit of the product of the first and second digital numbers and storing the residue in the shift register as the accumulated value.

9. The method of claim 8 further comprising producing the product with up to N bits by providing the first and second adders with bit precision of $N/2+1$ bits wherein N is an even number.

10. An apparatus for multiplying first and second digital numbers comprising:
(a) first and second serial input means for serially reading individual bits of the first and second digital numbers, respectively;
(b) means for storing first and second values represented by sequences of bits read by the first and second input means;
(c) first adder means having at least first and second first adder inputs and an output;
(d) means for routing to the first input of the first adder:
a logical zero when an nth bit read by the first input means is a logical zero, and the value stored by the storing means for the sequence of bits read by the second input means when an nth bit read by the first input means is a logical one;
(e) means for routing to the second input of the first adder:
a logical zero when an nth bit read by the second input means is a logical zero, and the value stored by the storing means for the sequence of bits read by the first input means when an nth bit read by the second input is a logical one;
(f) a second adder having a first input connected to the output of the first adder, a second input connected to an output of a means for accumulating a residue of a single bit shifting operation in a shifting means and an output connected to an input of the shifting means; and
(g) a product output port connected to a serial output of the shifting means producing bits representing a product of the first and second digital numbers.

11. The apparatus of claim 10 wherein the value stored by the storing means for the sequence of bits read by the second input means comprises a value of the first $n-1$ bits of the second digital number.

12. The apparatus of claim 10 wherein the value stored by the storing means for the sequence of bits read by the first input means comprises a value of the first n bits of the first digital number.

13. The apparatus of claim 10 wherein the routing means to the first and second inputs of the first adder further comprises logic circuitry means for outputting a logical OR function.

14. The apparatus of claim 10 further comprising a substantially dual bus structure wherein logical circuits responsive to the first input means and corresponding routing means to the first input of the first adder lie substantially on a first bus and logical circuits responsive to the second input means and corresponding routing means to the second input of the first adder lie substantially on a second bus.

15. The apparatus of claim 10 wherein the product of the first and second digital numbers has up to N bits and the first and second adder means have a precision of $N/2+1$ bits wherein N is an even number.

16. A reduced adder precision apparatus for multiplying first and second digital numbers comprising:
(a) first and second serial input means for serially reading individual bits of the first and second digital numbers, respectively;

(b) means for initializing to zero and for storing in digital form as a plurality of bits each of an assumed value of the output of the apparatus and values of first and second variables;

(c) means for initializing to zero and storing a number of zeroes encountered in reading the individual bits of the first and second digital numbers;

(d) means for setting bits of the first variable to a logical one, for incrementing the number of zeroes and for setting the assumed value to its previous value plus the value of the second variable each time a corresponding bit of the first digital number is read by the reading means to be a logical zero;

(e) means for setting bits of the second variable to one, for incrementing the number of zeroes and for setting the assumed value to its previous value plus the value of the first variable each time a corresponding bit of the second number is read by the reading means to be a zero;

(f) means for compensating the assumed value by subtracting the number of zeroes from the assumed value each time a pair of bits from the first and second digital numbers is read;

(g) means for outputting a series of bits, each bit output corresponding to the bit of the first and second digital numbers read by the reading means, the output bit being equal to the assumed value mod 2;

(h) means for shifting the assumed value right one bit, each time a bit is output and before reading a subsequent bit of the first and second digital words.

17. The apparatus of claim 16 further comprising means for generating a mask of the input bits of the digital words, the mask containing all logical ones, and means for correcting the masked value of a bit when a logical zero is detected by the reading means.

18. The apparatus of claim 16 wherein the series of bits output has up to N bits and the means for setting the assumed value to its previous value plus the value of the second variable and the means for setting the assumed value to its previous value plus the value of the first variable have a precision $N/2+1$ bits wherein N is an even number.

* * * * *